United States Patent [19]
Ito et al.

[11] Patent Number: 5,237,166
[45] Date of Patent: Aug. 17, 1993

[54] OPTICAL ATMOSPHERIC LINK APPARATUS WITH LIGHT PATH CORRECTION

[75] Inventors: Yujiro Ito; Koji Suzuki, both of Kanagawa, Japan

[73] Assignee: Sony Corporation, Tokyo, Japan

[21] Appl. No.: 783,767

[22] Filed: Oct. 28, 1991

[30] Foreign Application Priority Data

Oct. 30, 1990 [JP] Japan .................................. 2-292936

[51] Int. Cl.$^5$ .............................................. G01J 1/20
[52] U.S. Cl. .................................. 250/201.1; 356/152; 359/199
[58] Field of Search ............... 250/201.1, 206.1, 206.2; 356/141, 152; 359/199, 214, 213, 215, 224, 225

[56] References Cited

U.S. PATENT DOCUMENTS

| | | |
|---|---|---|
| 3,504,182 | 3/1970 | Pizzurro et al. |
| 3,511,998 | 5/1970 | Smokler |
| 3,566,126 | 2/1971 | Lang et al. |
| 3,828,185 | 8/1974 | Vandling |
| 3,981,566 | 9/1976 | Frank et al. ............................ 359/214 |
| 3,990,796 | 11/1976 | Foltz, Jr. .............................. 356/152 |
| 4,074,312 | 2/1978 | van Rosmalen ..................... 359/214 |
| 4,867,560 | 9/1989 | Kunitsugu ............................ 356/152 |
| 5,065,455 | 11/1991 | Ito et al. |

FOREIGN PATENT DOCUMENTS

1234997 7/1971 United Kingdom .

OTHER PUBLICATIONS

W. Auer, "Pointing, Acquisition and Tracking for Intersatellite Optical Data Links," Proc. ESA Workshop on Space Laser Applications and Technology, Les Diablerets, 26-30 Mar. 1984.

Primary Examiner—David C. Nelms
Assistant Examiner—Que T. Le
Attorney, Agent, or Firm—Philip M. Shaw, Jr.

[57] ABSTRACT

An optical atmospheric link apparatus transmits information data by means of a light beam, an error signal is generated representative of a difference between a direction of a light beam projected from a optical lens means and a direction of a light beam received from a remote transmitter/receiver and a position of a light path of the light beam incident into an optical lens from a light emission means is controlled on the basis of the error signal so that the direction of the light beam projected from the optical lens becomes coincident with the direction of the light beam received from the remote transmitter/receiver.

13 Claims, 16 Drawing Sheets

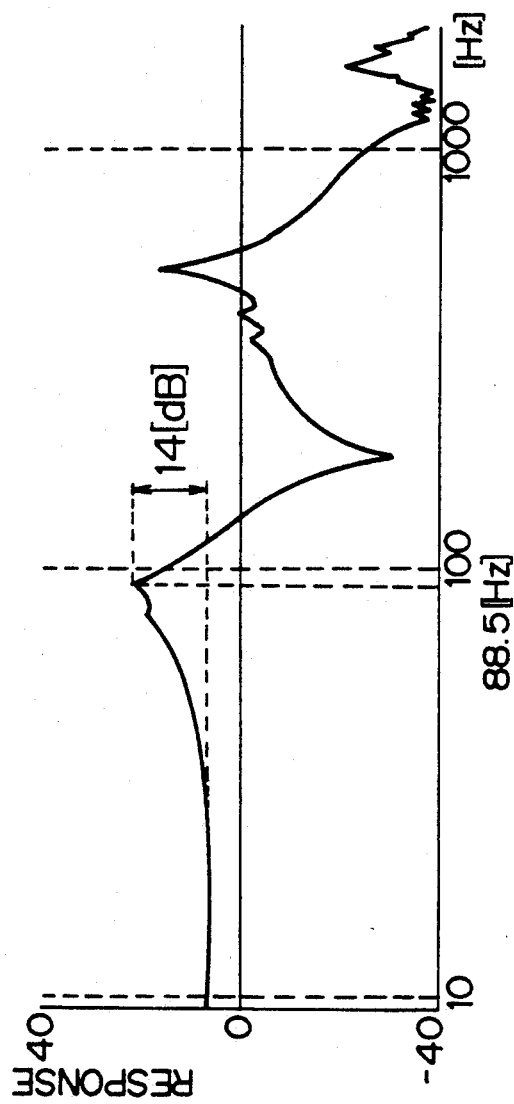
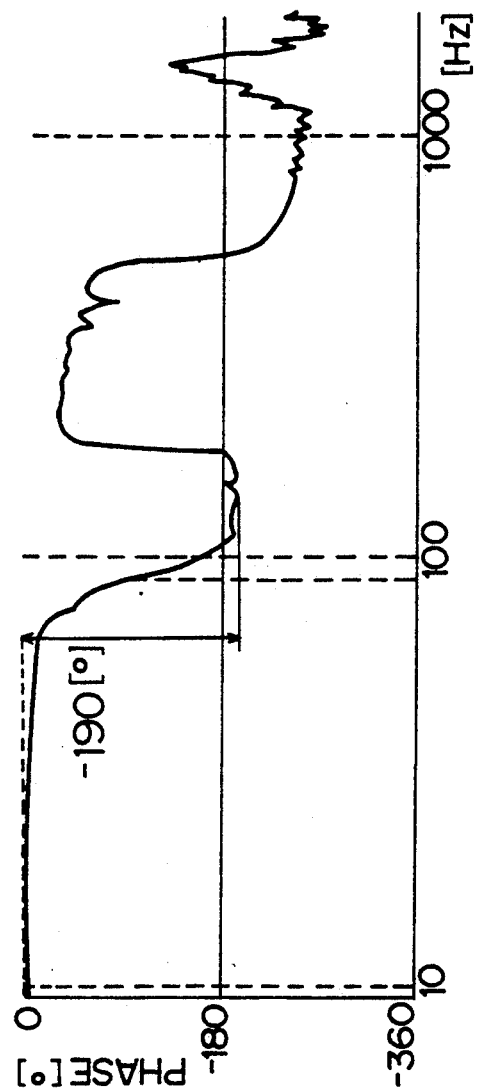
FIG.15A
FIG.15B

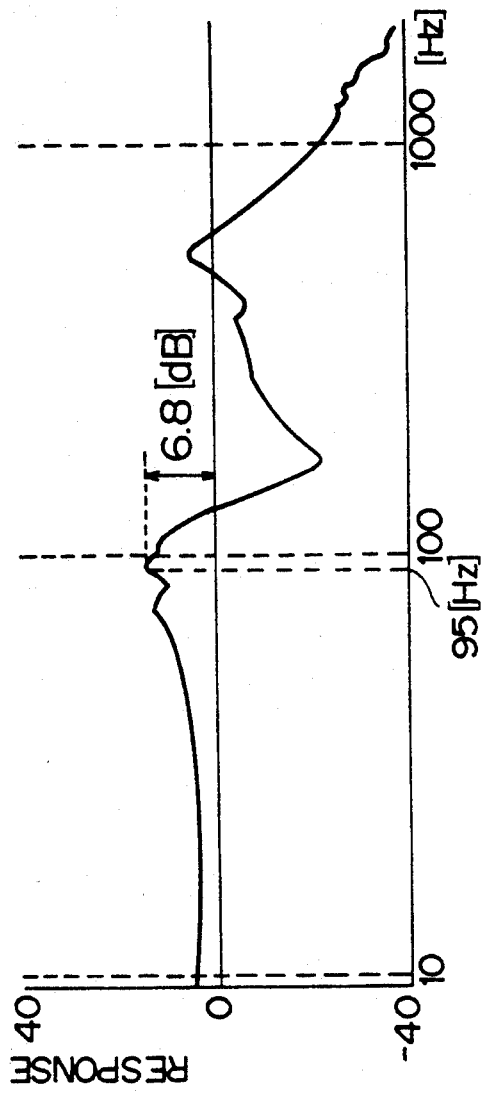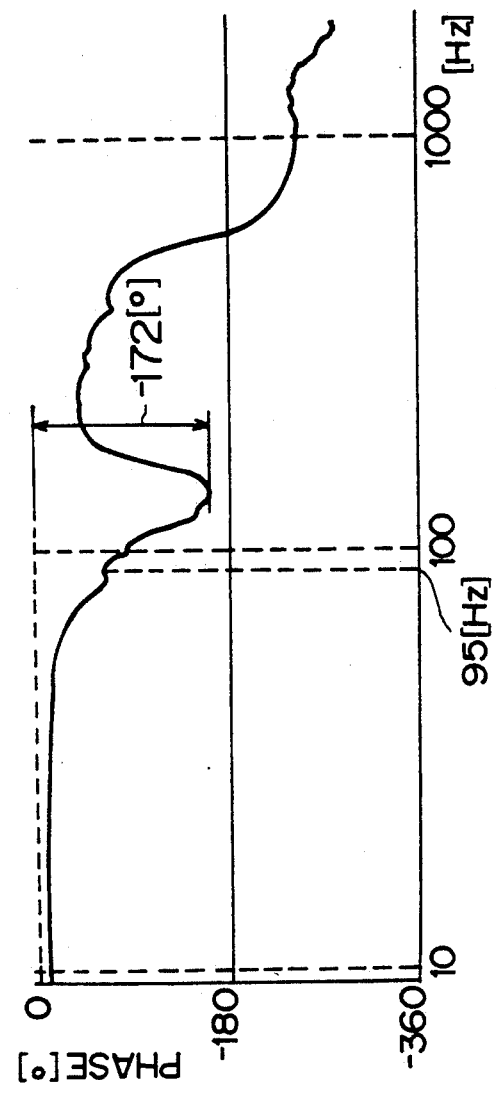

OPTICAL ATMOSPHERIC LINK APPARATUS WITH LIGHT PATH CORRECTION

BACKGROUND OF THE INVENTION

This invention relates to an optical atmospheric link apparatus which transmits information data through a light beam, and more particularly which automatically corrects the projection direction of the light beam. Conventionally, an optical atmospheric link apparatus has been proposed (Japanese Patent Application No. 2-276328) which observes a reflected portion of a light beam sent to a transmission object, together with an observation light coming from the transmission object, so as to readily confirm the correct illuminating position of the light beam.

That is, as shown in FIG. 1, an optical atmospheric link apparatus 1 drives a laser diode 2 by means of a predetermined information signal to project a light beam LA1 having a predetermined polarization plane from the laser diode 2. A lens 4 directs the light beam LA1 to a half-silvered mirror 8 through a polarizer 6 after having converted it to a parallel light beam. The half-silvered mirror 8 transmits a portion of the light beam LA1 therethrough and sends the transmitted light beam to the transmission object through lenses 16, 18. In this way the optical atmospheric link apparatus 1 can send the light beam LA1 having the predetermined polarization plane to the transmission object.

A reflection of the light beam LA1 is reflected by means of a corner cube prism 10, and the half-silvered mirror 8 directs the reflected light beam to an image pickup element 14 through a lens 12. Thereby, the optical atmospheric link apparatus 1 can separate a portion of the light beam LA1 sent to the transmission object and condense it to the image pickup element 14 after its reflection along its optical path.

The lens 18 also receives a light beam LA2 coming from the transmission object and directs it to the polarizer 6 through the lens 16 and the mirror 8. The transmission object projects the light beam LA2 so as to have a polarization plane which perpendicularly intersects the polarization plane of the light beam LA1 so that after the light beam LA2 passes through the half silvered mirror 8, is reflected by the polarizer 6, the optical atmospheric link apparatus 1 condenses the light beam LA2 onto a light receiving element 22 through a lens 20. Thus, the optical atmospheric link apparatus 1 receives the information by receiving the light beam LA2 coming from the transmission object.

Further, the lens 18 receives a light L1 (referred to as an observation light hereinafter) advancing from a scene around the transmission object to the optical atmospheric link apparatus 1 together with the light beam LA2 and directs the observation light L1 to the image pickup element 14 through the lens 16, the half-silvered mirror 8 and the lens 12. A component of the observation light L1, which component has an optical axis parallel to the light beam LA1, enters the lens 12 in parallel to the light reflected from the corner cube prism 10. Accordingly, the reflected light from the corner cube prism 10 enters the lens 12 along an optical path as if it was projected from the illuminating position of the light beam LA1 toward the image pickup element 14. The optical atmospheric link apparatus 1 provides a picked-up video having a light bright-point formed at the illuminating position of the light beam LA1, through the image pickup element 14, and confirms readily the illuminating position of the light beam LA1.

A pair of the optical atmospheric link apparatuses can be provided opposite to each other at two desired positions for use as a transmitting means on a relay of TV program. However, in the conventional optical atmospheric link apparatus which is used as the transmitting means, if either of the optical atmospheric link apparatus are shaken, the direction of the projecting light beam from one of the optical atmospheric link apparatuses might get out of alignment to receive the light beam from the other optical atmospheric link apparatus, as for example a truck runs on a road near the optical atmospheric link apparatuses, or the wind blows around the optical atmospheric link apparatuses.

SUMMARY OF THE INVENTION

In view of the foregoing, an object of this invention is to provide an optical atmospheric link apparatus in which, when information data is transmitted through a light beam, it is able to correct automatically the projection direction of the light beam.

The foregoing objects and other objects of the invention have been achieved by the provision of an optical atmospheric link apparatus for transmitting information data through a first light beam and receiving information data through a second light beam projected from a remote transmitter/receiver, comprising a light emission means for emitting the first light beam along a light path, an optical lens means, which is selectively angularly displaceable, for condensing the first light beam and projecting it in a direction toward the remote transmitter/receiver and for receiving the second light beam and directing it along the light path, and a two dimensional sensor means for receiving the second light beam and generating an error signal representative of a difference between the direction in which the first light beam is projected from the optical lens means and a direction in which the second light beam is received from the remote transmitter/receiver. A housing contains the light emission means, the optical lens means and the two dimensional sensor means. A light path diverting means diverts a portion of the light path between the optical lens means and the light emission means so as to change the direction, relative to the housing, in which the first light beam is projected and the second light beam is received by the optical lens means. Lastly, a control means supplied with the error signal controls the light path diverting means so that the direction, relative to the housing, in which the first light beam is projected and the second light beam is received by the optical lens means is aligned with the remote transmitter/receiver despite transitory movement of the housing.

In a preferred embodiment the light path diverting means is composed of a piezoelectric element which is deviated in response to an impressed voltage, a restricting vibration element adhered on a backside surface of the piezoelectric element, a supporting element for supporting the piezoelectric element and the restricting vibration element at a predetermined position by holding end portions of the piezoelectric element and the restricting vibration element in caught-in manner, and a mirror mounted on the other end portion of the piezoelectric element.

The nature, principle and utility of the invention will become more apparent from the following detailed description when read in conjunction with the accompanying drawings in which like parts are designated by like reference numerals or characters.

BRIEF DESCRIPTION OF THE DRAWINGS

In the accompanying drawings:

FIG. 15A is a graph of the frequency response of the mirror supported by a bimorph plate;

FIG. 15B shows the phase response of the mirror supported by a bimorph plate;

FIG. 17A shows the frequency response of the mirror of FIG. 16;

FIG. 17B shows the phase response of the mirror of FIG. 16;

DETAILED DESCRIPTION OF THE INVENTION

Figure 1:
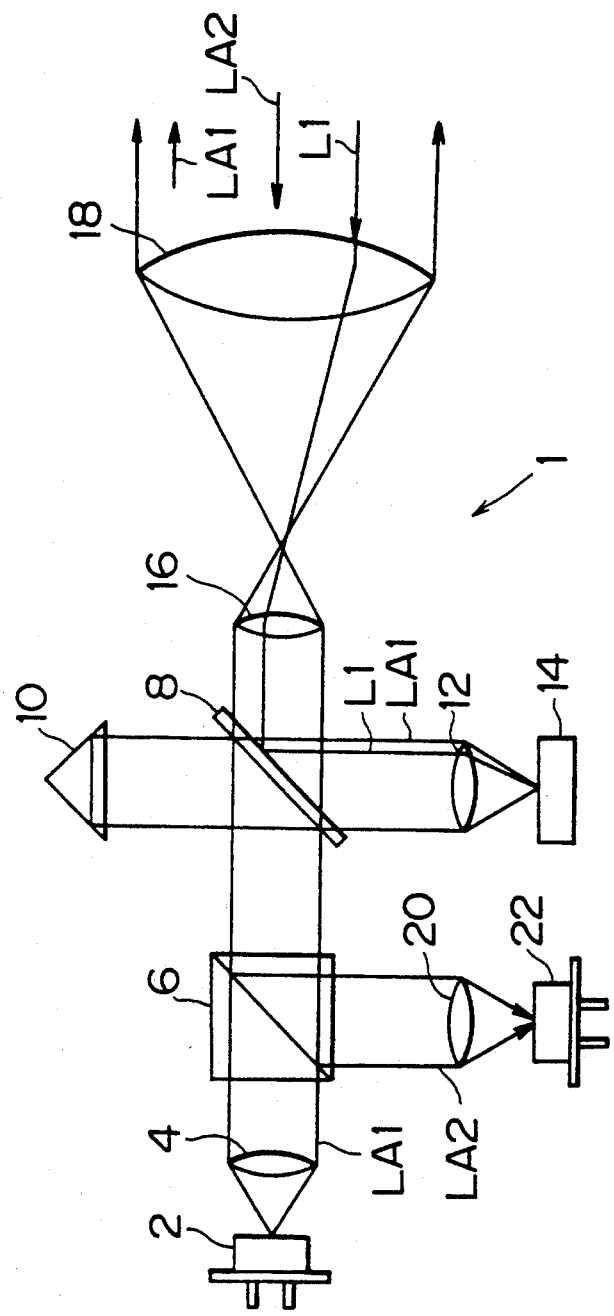
FIG. 1 is a schematic view of a conventional optical atmospheric link apparatus.
Figure 2:
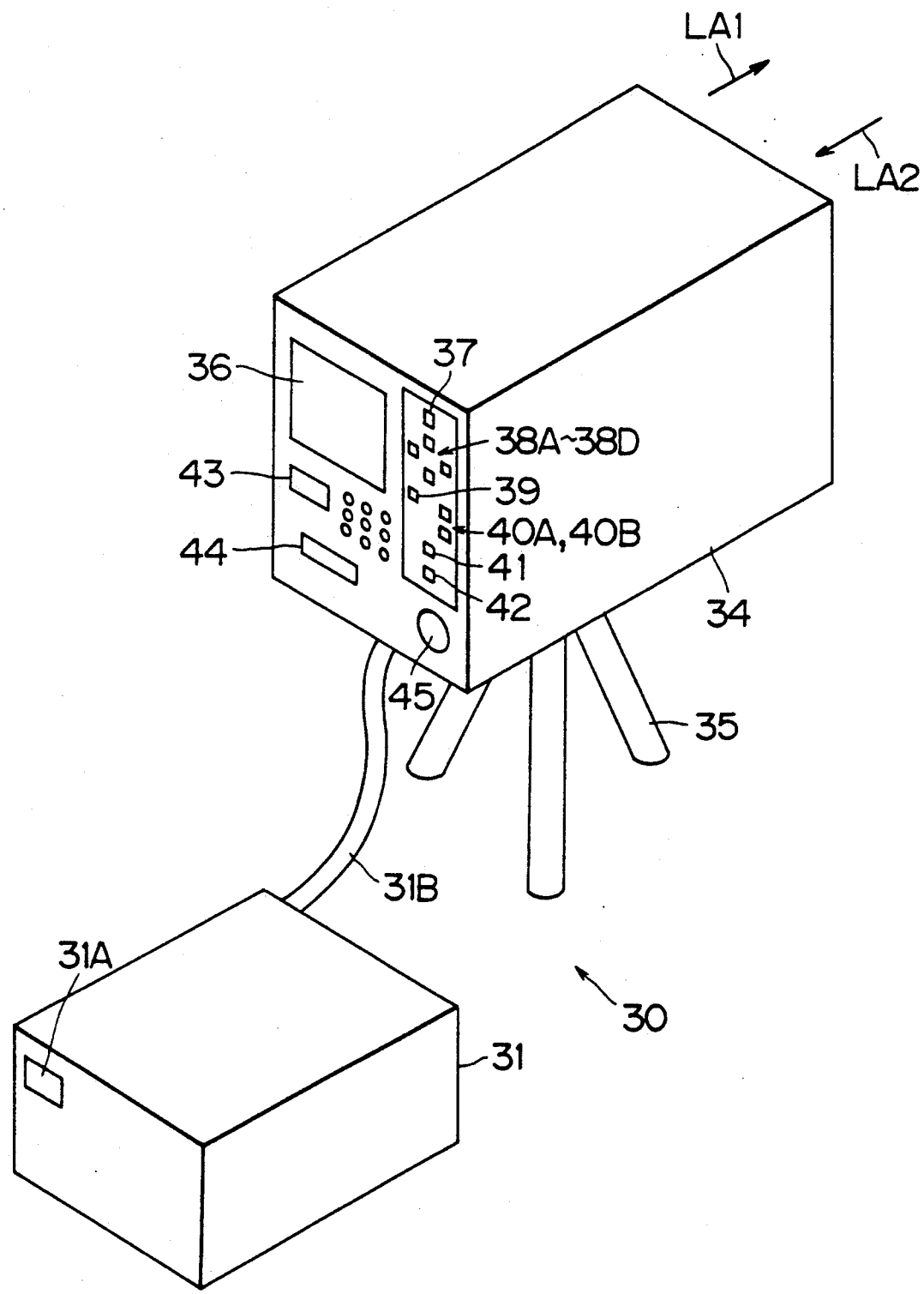
FIG. 2 is a perspective view of one embodiment of an optical atmospheric link apparatus according to the present invention.

Preferred embodiments of this invention will now be described with reference to the accompanying drawings:

In FIG. 2, the reference numeral 30 generally designates an optical atmospheric link apparatus which is driven by means of an electric power source supplied from a power source unit 31. The power source unit 31 accommodates a battery therein and serves to supply an electric power source of the battery to an optical atmospheric link apparatus body 34 through a cable 31B when a power source switch 31A disposed in its front surface is turned on. The optical atmospheric link apparatus body 34 is raised to an operation mode in response to the manipulation of the power source switch 31A disposed on the side of the power source unit 31, so that the battery can be readily interchanged on the side of the power source unit 31 in the optical atmospheric link apparatus 30.

The optical atmospheric link apparatus body 34 is mounted on a stand 35 and an illuminating position of a light beam LA1 projected from the optical atmospheric link apparatus body 34 can be confirmed through a display screen on an operation panel. The optical atmospheric link apparatus body 34 has an initializing switch 37 disposed at the upper portion of the operation panel and readjusts an illuminating position adjustment mechanism to an operation center when the initializing switch 37 is turned on.

Further, the optical atmospheric link apparatus body 34 has manipulation members 38A through 38D arranged below the initializing switch 37 for adjusting the illuminating position of the light beam LA1 in the upward, downward, leftward and rightward directions in response to manipulation of the respective manipulation members 38A through 38D. The optical atmospheric link apparatus body 34 adjusts the illuminating position of the light beam LA1 based on a light beam LA2 coming from a remote transmitter/receiver, referred to herein as a "transmission object," when a servo switch 39 is turned on after the illuminating position of the light beam LA1 has been adjusted, so that the adjusted condition can be visually confirmed by illuminations of light emitting elements 40A, 40B.

Beneath the servo switch 39 there are arranged a monitor switch 41 and a zooming manipulation switch 42. When the monitor switch 41 and the zooming manipulation switch 42 are turned on, the display screen is changed over to the ON state respectively and a magnifying power of the display screen is made variable. A monitor indicator 43 is disposed below the display screen 36, so that the light intensity of the light beam LA2 coming from the transmission object can be monitored by means of a pointer of the indicator 43.

Further, connectors 44, 45 are arranged in the lower portion of the operation panel, so that a received image signal and a communication signal can be output externally respectively.

Figure 3A:
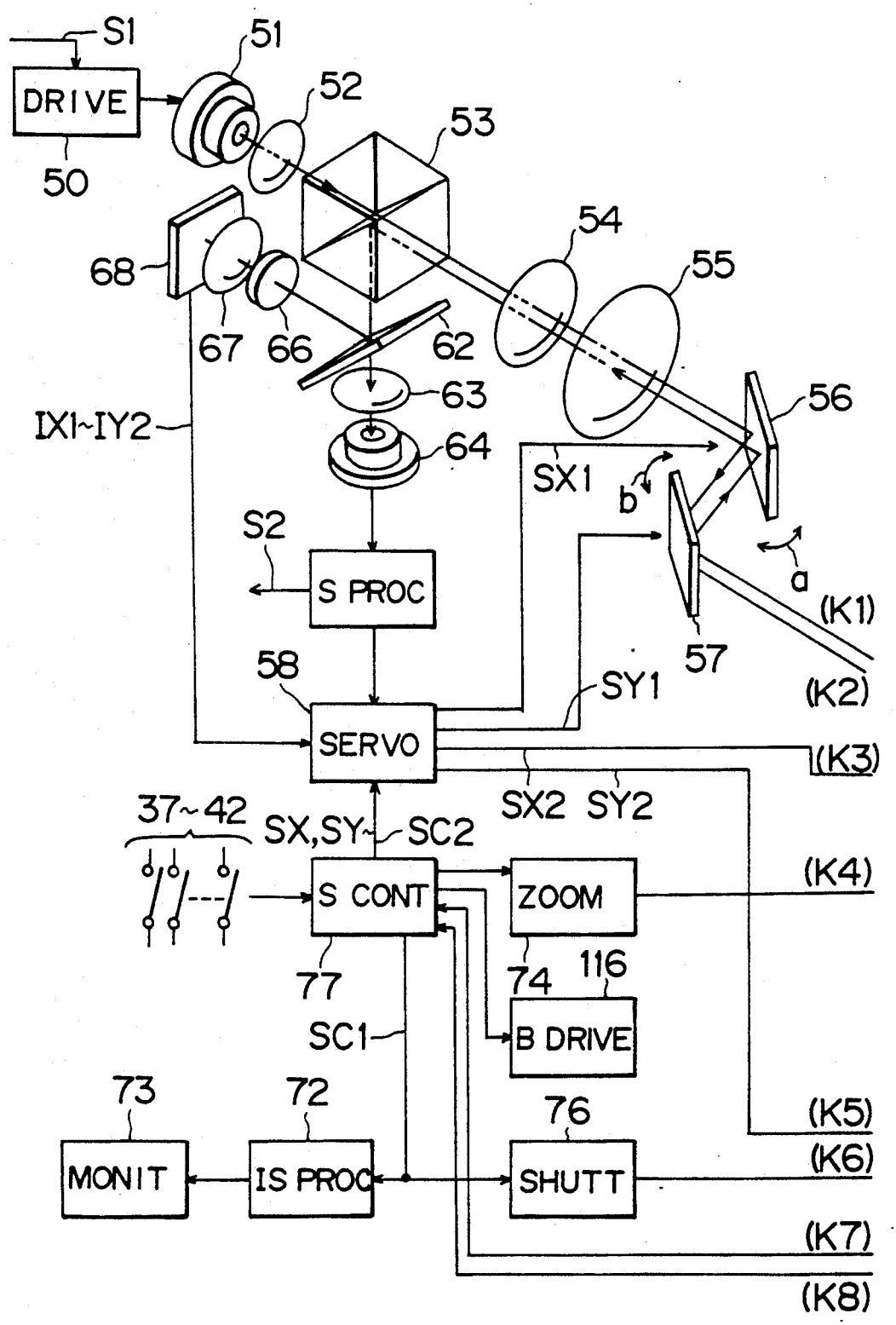
FIGS. 3A and 3B are together a schematic view of a transmission optical system of the optical atmospheric link apparatus shown in FIG. 1.
Figure 3B:
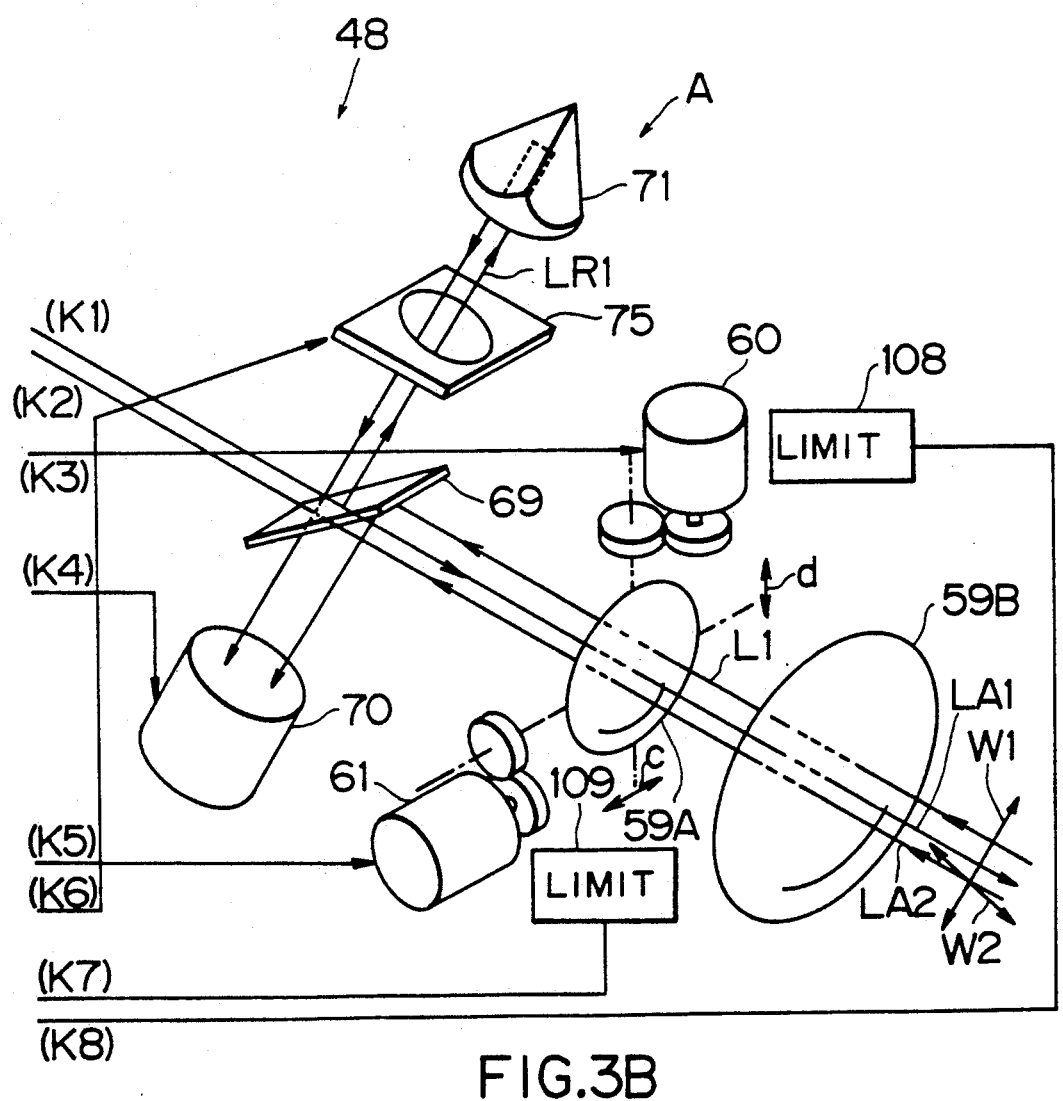

As shown in FIGS. 3A and 3B, the optical atmospheric link apparatus body 34 accommodates a transmission optical system 48 within a rectangular casing so that the light beams LA1, LA2 are transmitted and received, respectively, to and from the transmission object through the transmission optical system 48.

Within the transmission optical system 48 a drive circuit 50 drives a laser diode 51 by means of a desired information signal S1 to be presented for transmission. The laser diode 51 is held in a predetermined inclination with respect to a casing of the optical atmospheric link apparatus body 34, whereby the light beam LA1, having a polarization plane W1 inclined at an angle of 45 degrees with respect to the horizontal axis of the optical atmospheric link apparatus body 34, can be projected.

A lens 52 converts the light beam LA1 projected from the laser diode 51 to a parallel beam and transmits it through a polarizer 53 to a mirror 56 through a lens 54 and a lens 55. A mirror 56, inclined at an angle of 45 degrees with respect to the optical axis of the light beam LA1, bends the optical axis of the light beam LA1 at an angle of 90 degrees with respect to the horizontal direction.

In the bent optical axis of the light beam LA1 there is disposed a mirror 57 inclined at an angle of 45 degrees with respect to the optical axis of the light beam LA1, whereby the optical axis of the light beam LA1 which was bent by means of the mirror 56 is reflected substantially in parallel to the original optical axis thereof. The mirrors 56, 57 are angularly displacable in the horizontal direction and in the vertical direction, as indicated by the arrows a, b respectively, based on drive signals SX1, SY1 output from a servo circuit 58.

Thereby, the mirrors 56, 57 are capable of finely compensating the projection direction of the light beam LA1 projected from the optical atmospheric link apparatus body 34 by angularly displacing the optical axis of the light beam LA1 a little in the upward, downward, leftward or rightward direction.

A lens 59A condenses the light beam LA1 reflected by means of the mirror 57 and then sends it to the transmission object through a lens 59B so as to send the light beam LA1 to the transmission object. The lens 59A is driven by means of a motor 60, 61 so as to be angularly displacable upwardly, downwardly, leftwardly or rightwardly, as indicated by the arrows c, d, whereby the projecting direction of the light beam LA1 can be roughly adjusted based on the drive signals SX2, SY2 output from the servo circuit 58.

Accordingly, since the optical atmospheric link apparatus body 34 has the mirrors 56, 57 and the lens 59A all of which are angularly displaceable, it becomes possible to direct the light beam LA1 to the transmission object with certainty even in case that the optical atmospheric link apparatus body 34 might be vibrated by the wind and so on.

The light beam LA2 coming from the transmission object, i.e., the other optical atmospheric link apparatus (not shown) is received by means of the lens 59B, advances in reverse along the optical path of the light beam LA1 and enters the polarizer 53. The light beam LA2 is projected from the other optical atmospheric link apparatus in a manner such that the polarization plane W2 perpendicularly intersects the polarization plane W1 of the light beam LA1. The light beam LA2 is reflected by means of the polarizer 53 and enters the half-silvered mirror 62. The half-silvered mirror 62 condenses the light beam LA2 onto the light-receiving element 64 through the lens 63.

The optical atmospheric link apparatus body 34 can receive an information signal S2 transmitted from the transmission object by demodulating the output of the light-receiving element 64 by means of a signal processing circuit 65.

Further, the half-silvered mirror 62 also reflects the light beam LA2 and condenses the light beam LA2 onto a light receiving surface of a position detecting sensor 68 through a filter 66 and a condensing lens 67. The position detecting sensor 68 is composed of a two dimensional position detecting sensor which serves to output signals IX1 through IY2, corresponding to a position of a light spot to be formed on the light receiving surface, to the servo circuit 58 and detects with high accuracy a projection position of the light beam LA2 relative to the optical atmospheric link apparatus body 34 based on the output signals IX1 through IY2 of the position detecting sensor 68. That is, the servo circuit 58 performs an addition and subtraction process for the output signals IX1 through IY2 to generate an error signal and outputs the drive signals SX1 through SY2 based on the error signal.

Accordingly, the servo circuit 58 adjusts the illuminating position of the light beam LA1 based on the light beam LA2 and aligns the light beam LA1 with the transmission object even in the case when the optical atmospheric link apparatus body 34 is vibrated by wind and so on.

Along the optical path between the mirror 57 and the lens 59A there is disposed a collimate scope A, whereby the illuminating position of the light beam LA1 can be visually confirmed in the display screen 36. The collimate scope A has a half-silvered mirror 69 disposed in the light beam LA1 to reflect a portion LR1 of the light beam LA1 to a corner cube prism 71. A half-silvered mirror 69 receives an observation light L1 advancing from a scene around the transmission object toward the optical atmospheric link apparatus 1 through the lenses 59B, 59A and reflects the observation light L1 in the reverse direction with respect to the light beam LA1 so that the light L1 enters into an image pickup optical system 70.

The corner cube prism 71 receives the reflected light LR1 of the light beam LA1 and directs it to the image pickup optical system 70 through the half-silvered mirror 69 after having reflected the optical path of the reflected light LR1 in parallel thereto. The pickup optical system 70 condenses the reflected light LR1 and the observation light L1 onto a pickup element accommodated therewithin and outputs an output signal of the pickup element to a pickup signal processing circuit 72. The pickup signal processing circuit 72 converts the output signal of the pickup element to a video signal and then outputs it to a monitor unit 73, whereby the illuminating position of the light beam LA1 can be observed as a light bright-point on the scene of the transmission object through the display screen 36 of the operation panel.

The pickup optical system 70 is also driven by a zooming drive-circuit 74 so as to make its magnification variable. Accordingly, the optical atmospheric link apparatus body 34 can readily adjust the illuminating position of the light beam LA1 by enlarging the magnification in sequence to readjust the position and actuating the servo circuit 58 within a predetermined range after having roughly adjusted the illuminating position of the light beam LA1 with a small magnification.

Between t he corner cube prism 71 and the half-silvered mirror 69 there is interposed a shutter 75. By closing the shutter 75 as required, the light beam LA1 is prevented from returning to the light-receiving element 64 at the time of communication. That is, the shutter 75 is driven closed by means of a shutter drive circuit 76 and is changed over to its opened state from its light shielding state under the control of the image pickup signal processing circuit 72.

When the monitor switch 41 is turned on, the optical atmospheric link apparatus body 34 presents a display video in the display screen 36 because of a shutter control signal SC1 which is output from a system control circuit 77 to the shutter control circuit 76, and the user can confirm the illuminating position of the light beam LA1 on the display screen.

After the illuminating position of the light beam LA1 has been adjusted, the optical path of the light beam LA1 reflected by the half-silvered mirror 69 can be blocked by changing over the monitor switch 41 to its OFF state, thereby closing the shutter 75. When the shutter 75 is closed, the optical path extending to the light-receiving element 64 through the half-silvered mirror 69, the mirrors 57, 56, the lenses 55, 54, the polarizer 53, the half-silvered mirror 62 and the lens 63 is blocked after the light beam LA1 reflected by the half-silvered mirror 69 has been reflected by the corner cube prism 71. Accordingly, it is possible to surely receive the information by reducing crosstalk generation. Also prevented is the return of the light beam LA1 to the laser diode 51.

Figure 4:
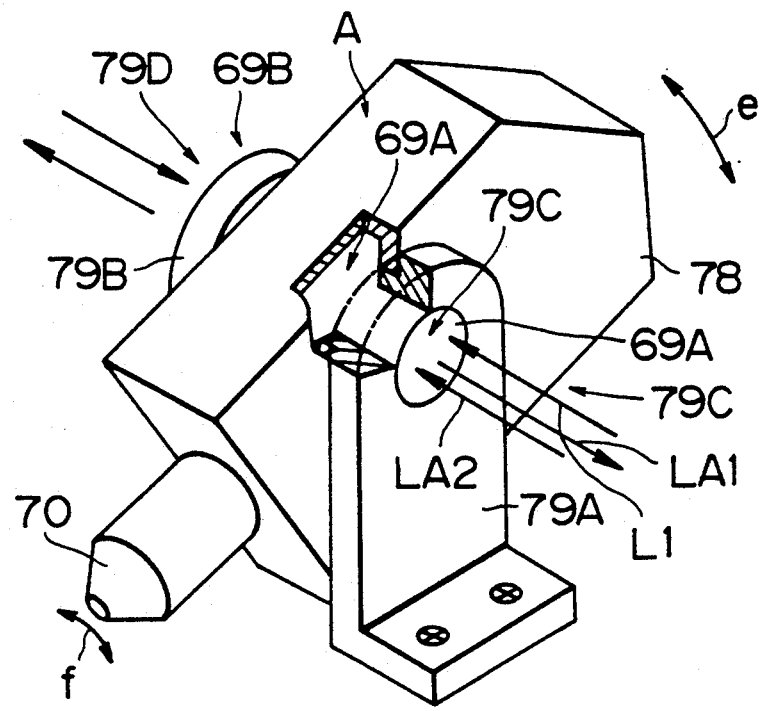
FIG. 4 is a perspective view of a collimation scope of the optical atmospheric link apparatus shown in FIG. 1.

As shown in FIG. 4, the collimate scope A is accommodated within a casing 78 and pivoted about the optical path of the lens 59B as the pivot center as indicated by the arrow e. The casing 78 has windows 69A, 69B formed before and behind the half-silvered mirror 69, and tubular projections of holding members 79A, 79B are fitted to the windows 69A, 69B so as to hold the casing 78 from both foreside and backside. The light beams LA1, LA2 and the observation light L1 can enter the half-silvered mirror 69 through the tubular introduction portions 79C, 79D formed in the insides of the windows 69A, 69B.

Figure 5:
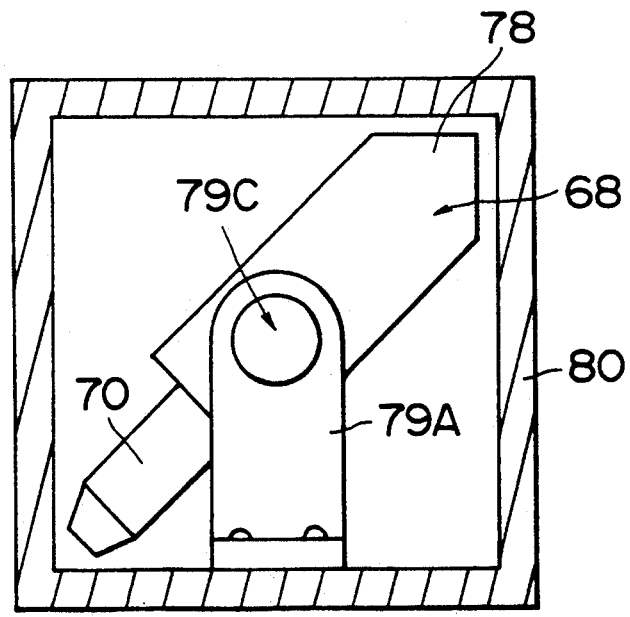
FIG. 5 is a vertical sectional view of a construction of the collimation scope.

As shown in FIG. 5, the holding members 79A, 79B are fixedly secured at their base portions to a casing 80 of the optical atmospheric link apparatus body 34, whereby the whole of the collimate scope A can be pivoted about the optical axis of the lens 59B as the pivot center by slidably moving the windows 69A, 69B relative to the tubular projections. The casing 80 is formed in a rectangular configuration, and on the other hand, the collimate scope A is held wholly inclined in the diagonal direction of the casing 80.

Since the corner cube prism 71 and the pickup optical system 70 can't help projecting with respect to a mirror tube of the transmission optical system 48, the whole configuration becomes correspondingly larger. The weight thereof increases as well and the portability thereof is degraded correspondingly by that enlargement.

Therefore, in the optical atmospheric link apparatus body 34, by holding the collimate scope A inclined in the diagonal direction, the collimate scope A can be accommodated within the casing 80 to make effective use of the interior space of the casing 80 so that the whole configuration can be made small. Accordingly, the whole weight thereof can be made lighter as well and the portability thereof can be improved.

Further, since the collimate scope A is pivotable with respect to the optical axis of the lens 59A, it can be disposed at various inclination angles according to the configuration of the casing 80 to be assembled. Thereby, it becomes possible to use the transmission optical system in common for various kinds of optical atmospheric link apparatus.

The corner portions extending forwards and backwards in the corner cube prism 71 accommodating portion of the casing 78, namely, the upper portion of the casing 78, are largely chamfered according to the configuration of the corner cube prism 71. These features allow the casing 78 to be small-sized in configuration while accommodating the collimate scope A and useless space is not present within the casing 80 when the collimate scope A is held in the wholly inclined manner in the diagonal direction.

Incidentally, in the case that the collimate scope A is held in the inclined manner an inclined display image in displayed on the display screen 36.

The image pickup optical system 70 of the collimate scope A is held pivotally about the pivot center composed of the optical axis of the image pickup optical system 70 as indicated by the arrow f. In the optical atmospheric link apparatus body 34, the horizontal and vertical directions in the display screen 36 are correctly displayed by an angular displacement of the image pickup optical system 70 according to the inclination of the collimate scope A.

Incidentally, the image pickup optical system 70 also has its leading end portion tapered similarly to the corner cube prism 71 accommodation portion, whereby it is intended that no useless space is present within the casing 80. Thus, it is possible to make the whole configuration smaller in size as well as to improve the convenience of use of the optical atmospheric link apparatus 30.

When a control signal SC2 is output from a system control circuit 77 in response to manipulations of the servo switch 39 and the initializing switch 37, the servo circuit 58 is raised to its operation mode. The servo circuit 58 adjusts the illuminating position of the light beam LA1 and the polarization plane W1 of the light beam LA1 based on the output signals IX1 through IY2 of the position detecting sensor 68 so as to ensure transmission and reception of the information.

Figure 6:
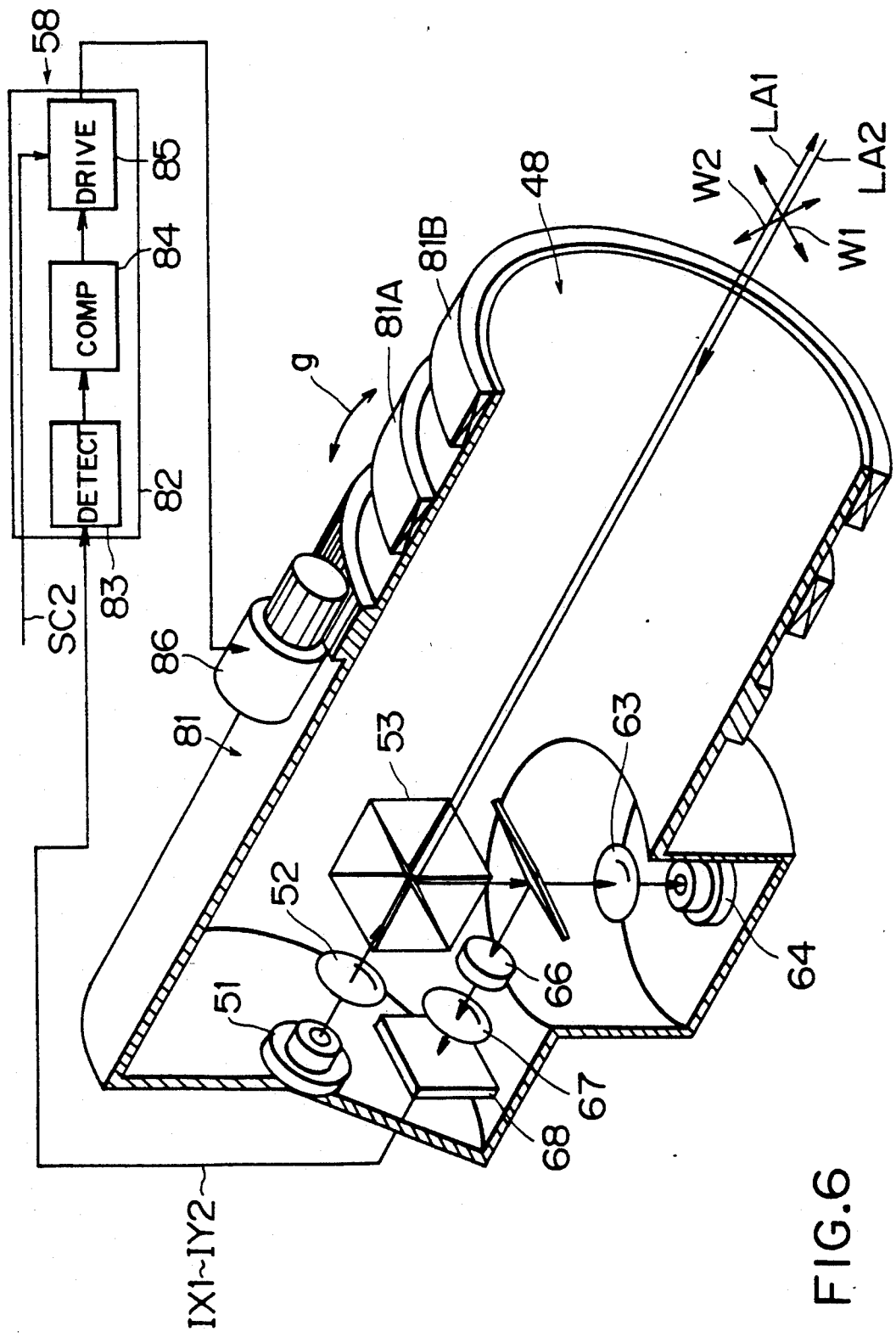
FIG. 6 is a perspective sectional view for use in explaining how to correct a polarization plane in the optical atmospheric link apparatus shown in FIG. 1.

As shown in FIG. 6, in the transmission optical system 48, the optical system from the laser diode 51 to the polarizer 53 and the optical system from the polarizer 53 to the position detecting sensor 68 and to the light-receiving element 64 are held as one unit by means of a mirror-barrel 81. The polarizer 53 is so held that its polarization plane in the transmitting direction coincides with the polarization plane W1 of the laser diode 51. In the case that the polarization plane W1 of the light beam LA1 is held exactly at an angle of 90 degrees with respect to the light beam LA2, the light beam LA2 which has entered the polarizer 53 is fully reflected by the polarizer 53 and the light beam LA2 can enter the position detecting sensor 68 most efficiently.

The mirror-barrel 81 is coaxially rotatable about the light path of the beam LA1, as indicated by the arrow g with respect to the body of the transmission optical system 48 (that is, comprising the optical system from the mirror 56 to the lens 59B) through bearings 81A, 81B. The optical atmospheric link apparatus body 34 adjusts the polarization plane W1 of the light beam LA1 with respect to the polarization plane W2 of the light beam LA2 by rotating the mirror-barrel 81 and then holding it in place.

That is, in the servo circuit 58, a polarization plane servo circuit 82 receives the output signals IX1 through IY2 of the position detecting sensor 68 into a detection circuit 83. The detection circuit 83 detects the light intensity of the light beam LA2 which enters the position detecting sensor 68 by performing the addition of the output signals IX1 through IY2. A comparison circuit 84 receives the detection results of the detection circuit 83 in a predetermined period to provide comparison results in sequence, whereby a change of the light quantity of the light beam LA2 which enters the position detection sensor 68 is detected.

When the control signal SC2 is generated, a drive circuit 85 drives a motor 86 based on the detection results to turn the mirror-barrel 81 in a direction which increases the entering light quantity for the position detecting sensor 68. The rotational direction of the mirror-barrel 81 is reversed when the entering light quantity decreases. The optical atmospheric link apparatus body 34 thereby serves to perpendicularly align the polarization plane W1 of the light beam LA1 and the polarization plane W2 of the polarizer 53 based on the entering light quantity for the position detecting sensor 68 so that the polarization plane W2 of the light beam LA2 and the polarization plane W1 of the light beam LA1 perpendicularly intersect each other.

Accordingly, even in the case that the optical atmospheric link apparatus body 34 is disposed in an inclined manner, it is possible to let the light beam LA2 efficiently enter the light-receiving element 64 by automatically adjusting the polarization plane. Further, even in the case that the optical atmospheric link apparatus body 34 is wholly vibrated so as to swing left and right, it is possible to let the light beam LA2 efficiently enter the light-receiving element 64 by automatically adjusting the polarization plane. Accordingly, in the case that it is mounted to a ship, a car, an aircraft, a satellite and so on for transmitting required information, it is possible to surely receive the information.

Further, it is possible to send to the transmission object the light beam LA1 having the polarization plane W1 inclined exactly at an angle of 90 degrees with respect to the polarization plane W2 of the light beam LA2 so that the transmission object can receive the light beam LA1 surely and the information signals S1, S2 can be surely transmitted and received.

Figure 7:
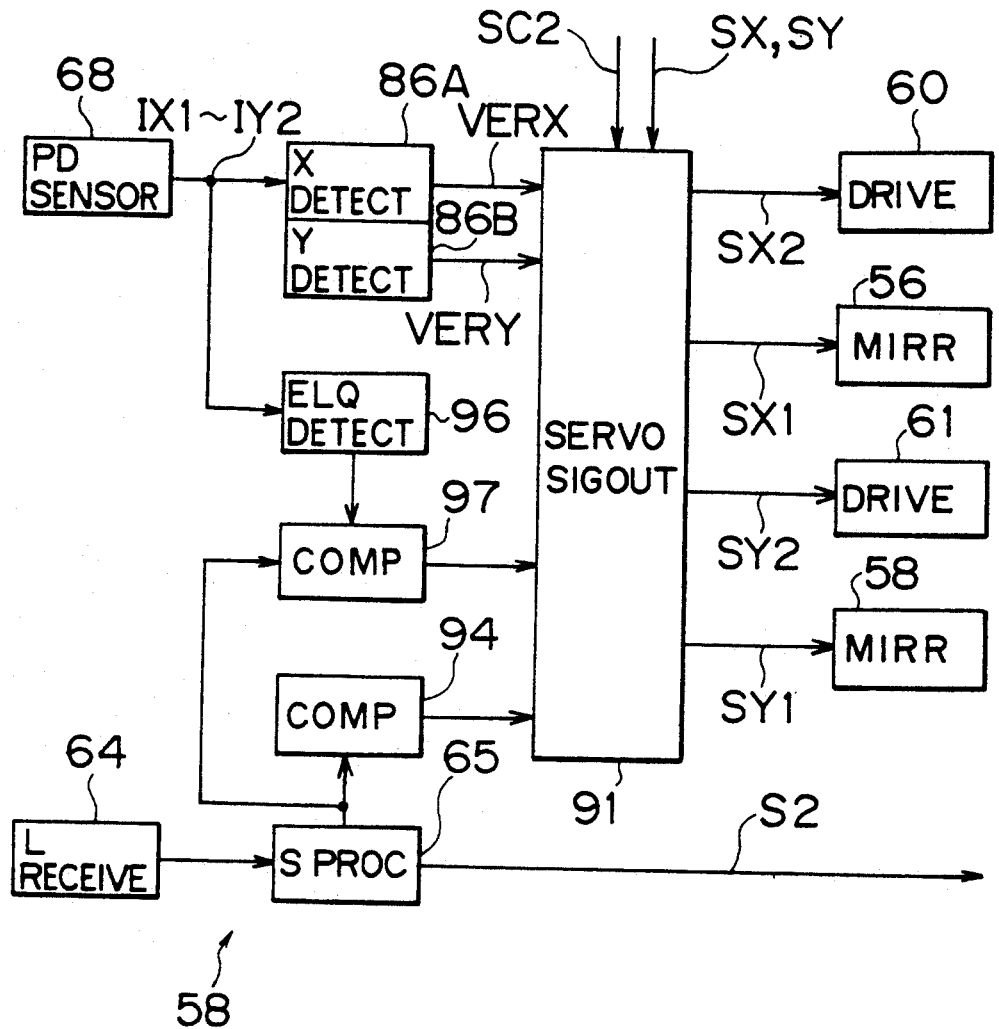
FIG. 7 is a block diagram of a servo circuit of the optical atmospheric link apparatus shown in FIG. 1.
Figure 8:
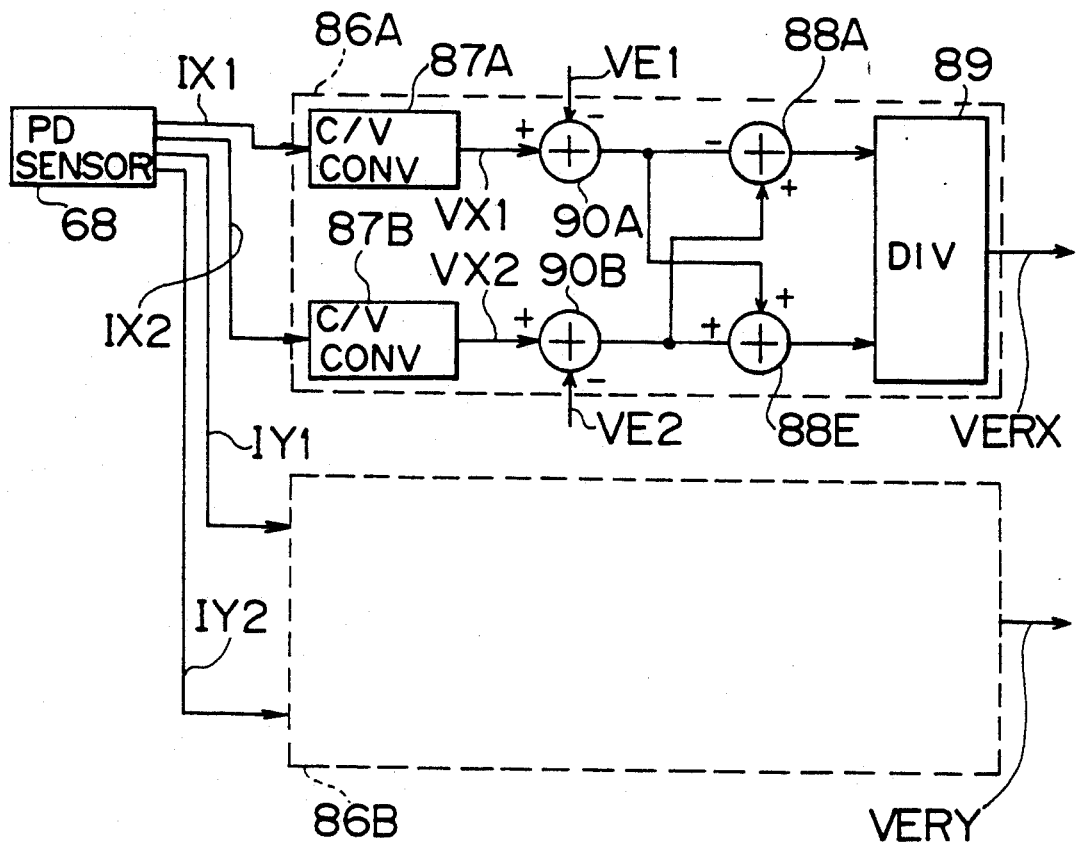
FIG. 8 is a block diagram of a position detection circuit of the optical atmospheric link apparatus shown in FIG. 1.

As shown in FIG. 7, in the servo circuit 58, the output signals IX1 through IY2 of the position detecting sensor 68 are given to an X-directional position detecting circuit 86A and a Y-directional position detecting circuit 86B to detect error signals VERX, VERY. As shown in FIG. 8, the X-directional position detecting circuit 86A receives the output signals IX1, IX2 of the position detecting sensor 68 as the inputs to current-voltage conversion circuits 87A, 87B, respectively.

A subtraction circuit 88A and an addition circuit 88B output a subtraction signal and an addition signal for output signals VX1, VX2 which are output from the current-voltage conversion circuits 87A, 87B respectively. A division circuit 89 divides the subtraction signal output from the subtraction circuit 88A by the addition signal output from the addition circuit 88B and outputs a result of the division as an error signal VERX.

Figure 9:
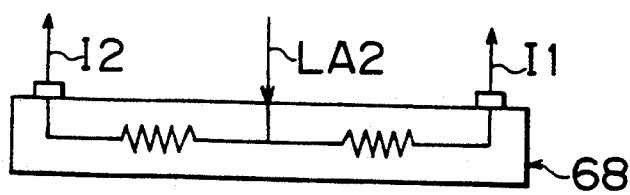
FIG. 9 is a wiring diagram of a position detection sensor of the optical atmospheric link apparatus shown in FIG. 1.

As shown in FIG. 9, in the position detecting sensor 68, when the light beam LA2 is condensed onto a light-receiving surface composed of a photoelectric conversion membrane, a current flows through a resistance layer in accordance with a condensed position of the light beam LA2 so that a ratio of output currents I1, I2 changes. For the moment, assume that $IX1=I1$ and $IX2=I2$. Similarly, in the Y direction the ratio of the output currents IY1 and IY2 changes.

Since it is possible to obtain the X-directional error signal VERX which is represented by the following relative expression through the division circuit 89, the condensed position of the light beam LA2 can be detected.

$$VERX = K1 \cdot (IX1 - IX2)/(IX1 + IX2) \tag{1}$$

Wherein K1 represents a constant.

The Y-directional position detecting circuit 86B serves to similarly perform the addition and subtraction processes for the output signals IY1, IY2 of the position detecting sensor 68 to generate the Y-directional error signal VERY.

Thereby, it is possible to detect a positional deviation of the light beam LA2 based on the error signals VERX, VERY, and it is possible to compensate the illuminating position of the light beam LA1 by driving the mirrors 56, 57 and the lens 59A based on the detected results.

Incidentally, in the position detecting sensor 68, with the light beam LA2, if the light beam LA1 is reflected through the lenses 59A, 59B and the like, a measurement error can't help but be generated in the error signals VERX, VERY. Therefore, in this embodiment, by interrupting the sending of the light beam LA2, detecting measurement errors and then compensating the error signals VERX, VERY based on the measurement results, a degradation of the measurement accuracy is prevented at the time of mounting.

That is, when in the X-direction, if the output signal components of the light receiving element 68 provided by the reflected light are designated by the symbols I1E, I2E and the components provided by the light beam LA2 are designated (as in FIG. 9) by the symbols I1, I2, the output signals IX1, IX2 can actually be represented by the following expressions.

$$IX1 = I1 + I1E \tag{2}$$

$$IX2 = I2 + I2E \tag{3}$$

When those are substituted into the expression (1), the following expression can be provided.

$$VERX = K1\{(I1+I1E)-(I2+I2E)\}/\{(I1+I17E)+(I2+I2E)\} \tag{4}$$

As a result, it can be understood that the output signals I1E, I2E of the position detecting sensor 68 should be detected when the entrance of the light beam LA2 is blocked and they should then be subtracted from the output signals IX1, IX2 at the time of entrance of the light beam LA2. Therefore, in the servo circuit 58, output voltages V1, V2 of the current-voltage conversion circuits 87A, 870 are detected by interrupting the sending of the light beams LA2 at the time of mounting.

Between the current-voltage conversion circuits 87A, 87B and the subtraction circuit 88A as well as the addition circuit 88B there are interposed subtraction circuits 90A, 90B respectively, so that the detection output voltages VE1, VE2, corresponding to the error currents I1E and I2E, respectively, are subtracted from the output signals of the current-voltage conversion circuits 87A, 87B at the time of illumination of the light beam LA2 to thereby compensate the error signal VERX. A similar operation takes place in the circuit 86B.

In practice, when the laser diode 51 is driven by using an APC (automatic power control) circuit, it projects the light beam LA1 so that its light intensity becomes constant. Therefore, it can be judged that the intensity of the light beam LA1 which reflects in the transmission optical system 48 and then enters the position detecting sensor 68 is substantially constant regardless of the presence and absence of the received light of the light beam LA2.

Accordingly, like this embodiment, when the output signal of the position detecting sensor 68 is detected in such a condition that the light beam LA2 is not received and the error signals VERX, VERY are compensated based on the detected results, it is possible to improve the measurement accuracy.

Even in the case that the intensity of the light beam LA2 is lowered due to an extension of the transmission distance, it is possible to provide the accurate error signals VERX, VERY, so that the transmission object can be illuminated by the light beam LA1 more surely.

Referring again to FIG. 7, when the servo control signal SC2 is generated, a servo signal output circuit 91 serves to amplify the error signals VERX, VERY and then to output the amplified error signals VERX, VERY as drive signals SX2, SY2 through a low-pass filter circuit (not shown) to the drive motors 60 and 61, respectively, of the lens 59A. The servo circuit 58 drives the drive motors 60, 61 to compensate for slow changes of the light beam illuminating position.

Further, the servo signal output circuit 91 extracts high frequency components of the amplified error signals VERX, VERY to generate drive signals SX1, SY1, to drive the mirrors 56, 57 at high speed to compensate the illuminating position of the light beam LA1. At that time, the servo signal output circuit 91 outputs the drive signals SX1 through SY2 so that the displacement centers of the mirrors 56, 57 coincide with the support centers of the mirror 56, 57. Thereby, the displacement centers of the mirrors 56, 57 are prevented from deviating from the support centers.

Incidentally, when control signal SX, SY are output from the system control circuit 77 to the servo circuit 58 in response to the manipulations of the operation members 38A through 38D after the control signal SC2 has dropped out, the servo signal output circuit 91 outputs the drive signals SX2, SY2 according to the control signals SX, SY, whereby the illuminating position of the light beam LA1 can be adjusted by manipulating the operation members 38A through 38D.

When the signal processing circuit 65 demodulates and outputs the output signal S2 of the light receiving element 64, it detects and outputs a signal level of the output signal.

A comparison circuit 94 obtains results compared between detection results of the signal process circuit 65 and certain comparison references for every predetermined period to output comparison results to the servo signal output circuit 91. The servo signal output circuit 91 detects a decrease of the light quantity of the light beam LA2 and stops the outputting of the drive signals SX1 through SY2 when the light quantity of the light beam LA2 decreases to not more than a predetermined value defined by the comparison reference.

Thereby, when the light quantity of the light beam LA2 decreases and the accuracies of the error signals VERX, VERY degrade, the servo signal output circuit 91 stops the servo operation and effectively avoids erroneous operation of the whole of the servo circuit. In this way, even in the case that the light quantity of the light beam LA2 decreases, the illuminating position of the light beam LA1 can be so held as not to be directed away from the transmission object and the servo operation can be surely performed just after the light quantity of the light beam LA2 has recovered to not less than a predetermined value. Accordingly, concerning the illuminating position of the light beam LA1, since it is possible to omit readjustment in the case that the light quantity of the light beam LA2 has decreased, the convenience of using the optical atmospheric link apparatus 30 is improved over conventional such devices.

Figure 10:
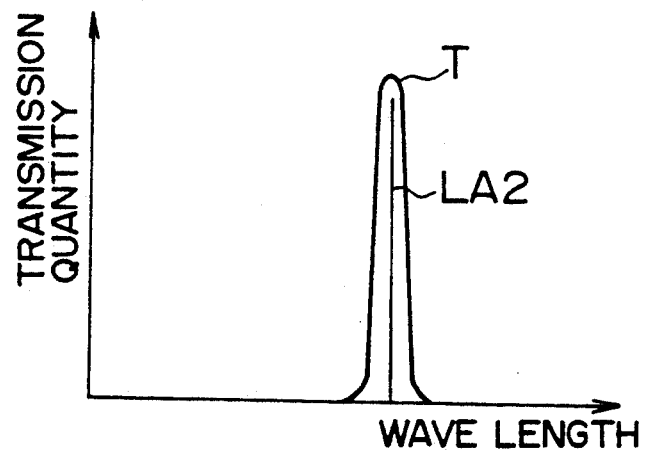
FIG. 10 is a characteristic curve of a wave length-transmission quantity characteristic of a filter of the optical atmospheric link apparatus shown in FIG. 1.
Figure 11:
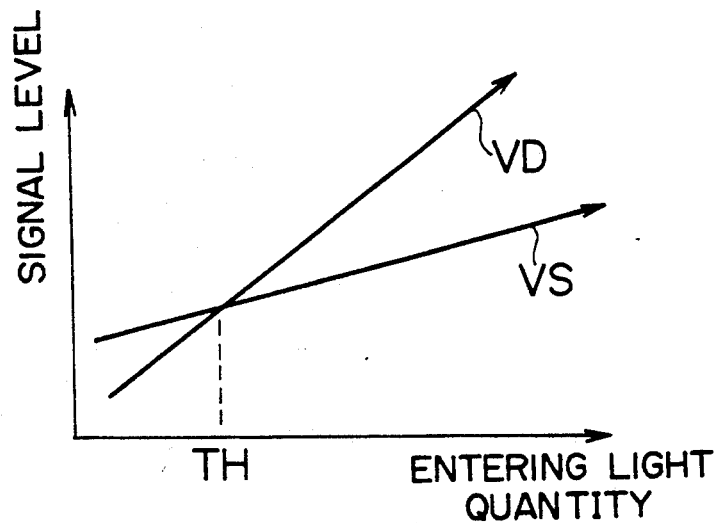
FIG. 11 is a characteristic curve of a relationship with sun light incident quantity in the optical atmospheric link apparatus and a signal level.

An entered light quantity detection circuit 96 performs an addition of the output signals IX1 through IY2 of the illuminating position sensor 68 to thereby detect an entering light quantity of the light beam LA2 which enters the position detecting sensor 68. As indicated by the symbol T in FIG. 10, in front of the position detecting sensor 68 there is arranged a narrow band filter 66 so disposed that a center wavelength in a passing band becomes a wavelength of the light beam LA2.

a comparison circuit 97 compares the detection output corresponding to VD in FIG. 11 from the entering light quantity detection circuit 96 and the output from the entering light quantity detection results corresponding to VS in FIG. 11 of the signal process circuit 65, outputs a comparison result to the servo signal output circuit 91 when the following expression is true, and stops the outputting of the drive signals SX1 through SY2:

$$VS < a \cdot VD \qquad (5)$$

Wherein $a$ is a certain constant.

That is, as shown in FIG. 11 since the narrow band filter 67 which transmits the light beam LA2 is disposed in front of the position detecting sensor 68, when the sun-light having a wide band enters the optical atmospheric link apparatus body 34, the light entering quantity VD of the light receiving element 68 remarkably increases in proportion to the entering light quantity VS of the position detecting sensor 64. Accordingly, by obtaining the comparison result of the entering light quantities of the light receiving element 68 and the position detecting sensor 64, it can be judged whether an increment of the entering light quantity is caused by the sunlight or not. The optical atmospheric link apparatus 30 stops the servo operation based on the expression (5) and stops the servo operation when the accuracies of the error signals VERX, VERY degrade due to an entrance of the sun-light.

Even when sunlight does enter, the optical atmospheric link apparatus 30 holds the illuminating position of the light beam LA1 so as to surely perform the servo operation just after the entrance of the sun-light has stopped. Accordingly, readjustment of the illuminating position of the light beam LA1 in the case of the entrance of sun-light can be omitted, making it more convenient to use the optical atmospheric link apparatus.

Figure 12:
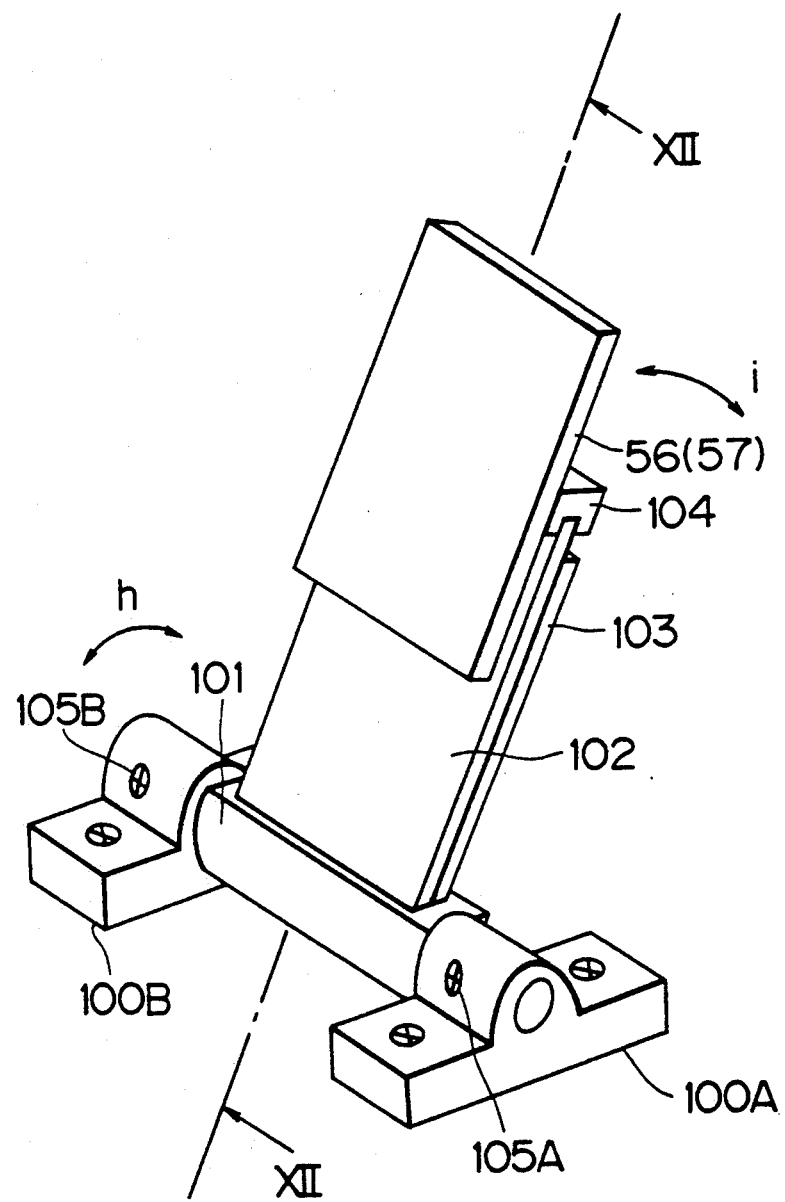
FIG. 12 is a perspective view of a mirror of the optical atmospheric link apparatus. The mirror is supported by means of the mirror-barrel of the body of the transmission optical system through a holding member.

The optical atmospheric link apparatus is further provided with vibration dampers. As shown in FIG. 12, the mirrors 56, 57 are supported by means of the mirror-barrel of the body of the transmission optical system 48 through a support member 102. Bearing supports 100A, 100B support a pivotable member 101 from opposite sides, whereby the pivotable member 101 is pivotally held as indicated by the arrow h.

Figure 13:
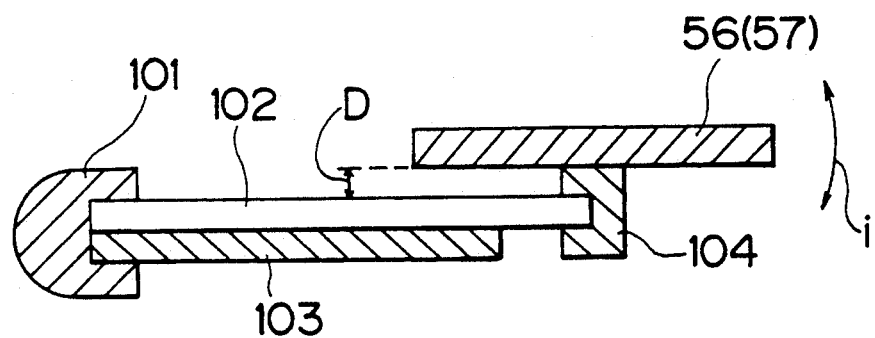
FIG. 13 is an enlarged cross-sectional view of the mirror of FIG. 12, supported by a mirror support member and a vibration-proof member in a caught-in manner.

As shown in FIGS. 12 and 13, the pivotable member 101 clamps together the mirror support member 102 and a vibration-proof member 103. The vibration-proof member 103 comprises a rubber sheet which is capable of absorbing a vibration, and is formed by cutting the sheet in a predetermined shape.

The mirror support member 102 comprises a bimorph plate, composed of a piezoelectric element, and the leading end thereof is displaced according to an imposed voltage as indicated by the arrow i. The leading end of the mirror support member 102 is inserted into a U-shaped groove of an adhesive support 104 and adheres thereto, and the mirror support member 102 holds the mirror 56 (57) through the adhesive support 104.

Thereby, the optical atmospheric link apparatus body 34 imposes the drive signals SX1, SY1 to the mirror support member 102 so as to displace the mirror 56 (57) and to adjust the illuminating position of the light beam LA1 by the displacement of the mirror 56 (57).

The bearing supports 100A, 100B are attached to the pivotable member 101 by screwing screws 105A, 105B into threaded holes provided in the bearing portions thereof to allow the attachment position of the mirror 56, 57 to be adjusted.

Thus, when the bimorph plate is used for displacing the mirror 56, 57 to compensate the illuminating position of the light beam LA1, it is possible to compensate the illuminating position of the light beam LA1 by a simple construction.

Further, it is possible to improve the response speed in comparison with that in the case wherein a galvanomirror is employed, so that it becomes possible to transmit the information more surely.

Figure 14:
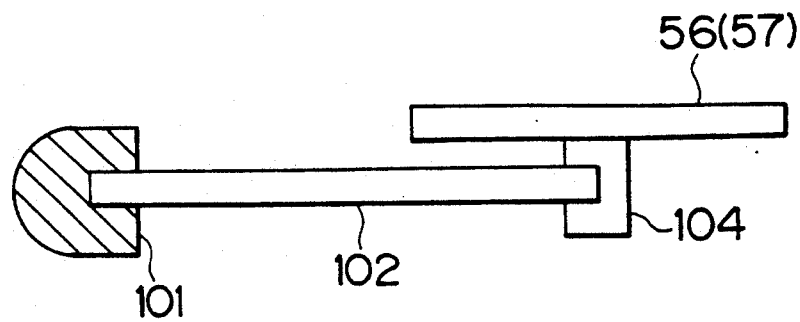
FIG. 14 is an enlarged cross-sectional view of a mirror supported by only a vibration-proof member.

If the vibration-proof member 103 is entirely adhered onto the mirror support member 102, there is the problem that a resonance frequency of the bimorph plate is low. As shown in FIG. 14 and FIGS. 15A and 15B, in the case that the mirror is simply supported by only the bimorph plate 102, its resonance point of 14 [dB] appears at the frequency of 88.5 [Hz] (FIG. 15A) and its phase changes to −190 degrees in maximum (FIG. 15B). Therefore, it is impossible to enlarge the gain of the servo circuit 58 and it becomes difficult to improve the follow-up speed.

Figure 16:
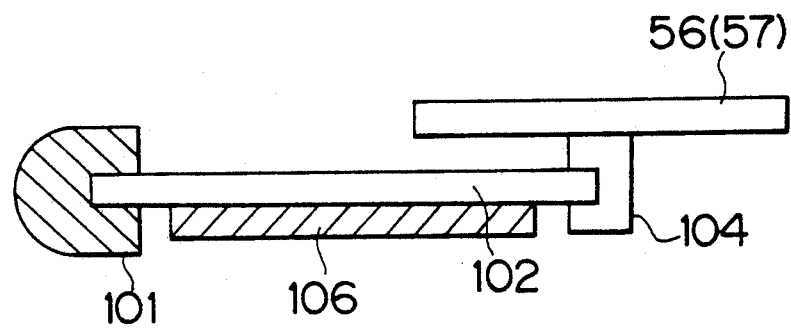
FIG. 16 is an enlarged cross-sectional view of the mirror of FIG. 12, supported by a mirror support member and a bimorph plate, the bimorph plate having a rubber sheet pasted onto it.

On the other hand, as shown in FIG. 16 and FIGS. 17A and 17B, when the rubber sheet member 106 is adhered onto the backside of the bimorph plate 102, the resonance frequency goes up to 95 [Hz] (FIG. 17A), and also the delay of the phase decreases to −172 degree (FIG. 17B).

Figure 18A:
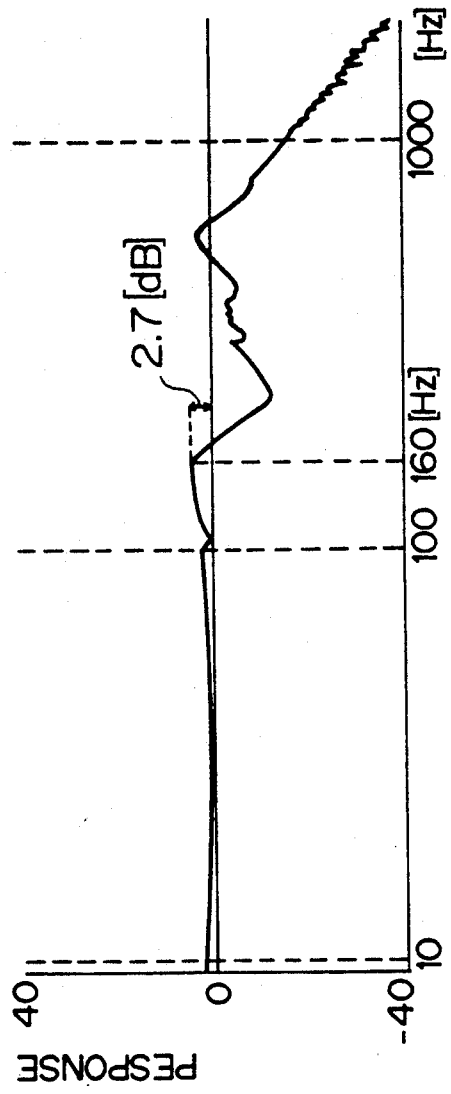
FIG. 18A shows the frequency response of a mirror supported by a bimorph plate with a rubber sheet pasted onto it, with the bimorph/rubber combination being held by a pivotable member in a caught-in manner.
Figure 18B:
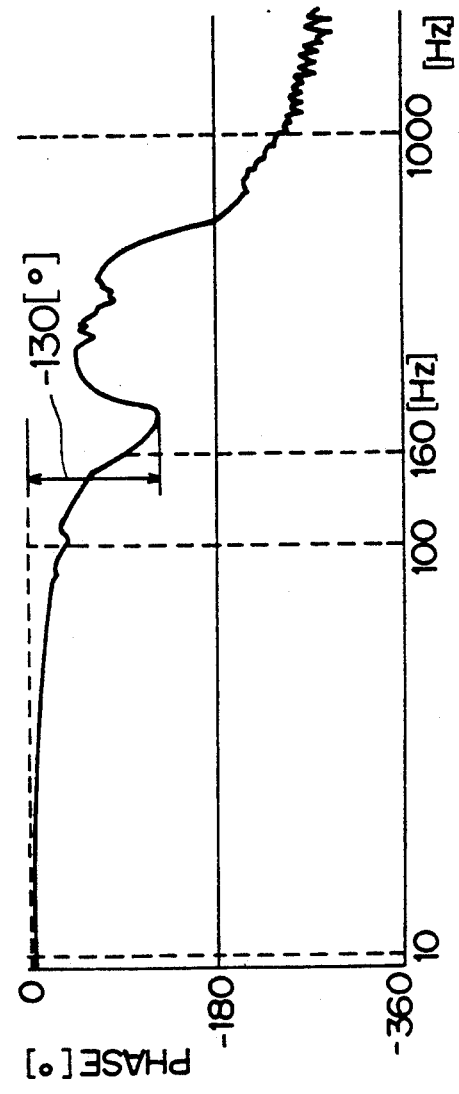
FIG. 18B shows the phase response of a mirror supported by a bimorph plate with a rubber sheet pasted onto it, with the bimorph/rubber combination being held by a pivotable member in a caught-in manner.

Further, like this embodiment, when the vibration-proof member 103 is adhered onto the bimorph plate 102 including at the point that they are held by the pivotable member 101 in the caught-in manner, the resonance frequency goes up to 160 [Hz](FIG. 18A) and also the delay of the phase can be decreased to −130 degree (FIG. 18B) as shown in FIG. 18. Accordingly, it is possible to improve the frequency characteristic of the bimorph plate 102, and it becomes possible to simplify the construction of the servo circuit 58.

Additionally, it is possible to compensate the illuminating position of the light beam LA1 due to high speed follow-up to a vibration and the like, and it becomes possible to improve the response speed.

Figure 19:
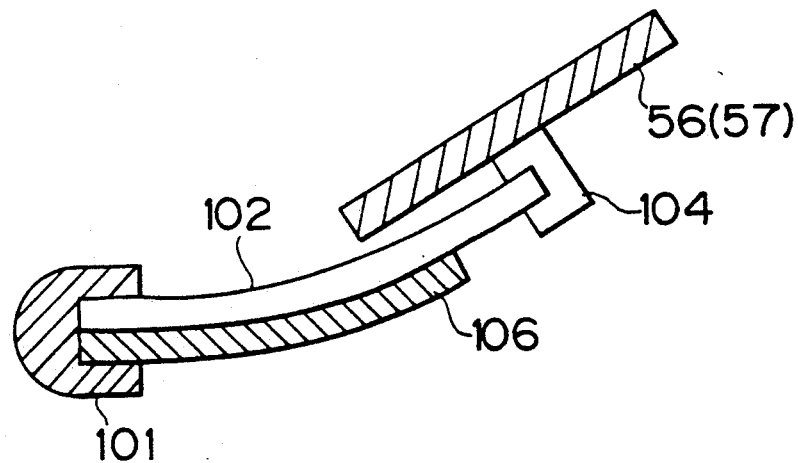
FIG. 19 is an enlarged, cross-sectional view of a mirror supported by a bimorph plate, with the bimorph plate deformed to the side of the mirror.

Further, in this embodiment, as best shown in FIG. 13, the adhesive support 104 holds the mirror 56 (57) at a position spaced apart by a predetermined distance D from the bimorph plate 102. In this way, as shown in FIG. 19, in case that the bimorph plate 102 and the mirror 56 (57) are adjacently disposed to each other, when the bimorph plate 102 is deformed to the side of the mirror 56 (57), the lower end portion of the mirror 56 (57), but for the spacing D, might come in contact with the bimorph plate 102, so that a displacement of the mirror 56 (57) would be restricted. By holding the mirror 56 (57) spaced apart by the predetermined distance D from the bimorph plate 102, however, the optical atmospheric link apparatus 30 is adapted to surely compensate the illuminating position of the light beam LA1 even though the bimorph plate 102 is deformed to a large degree.

Figure 20:
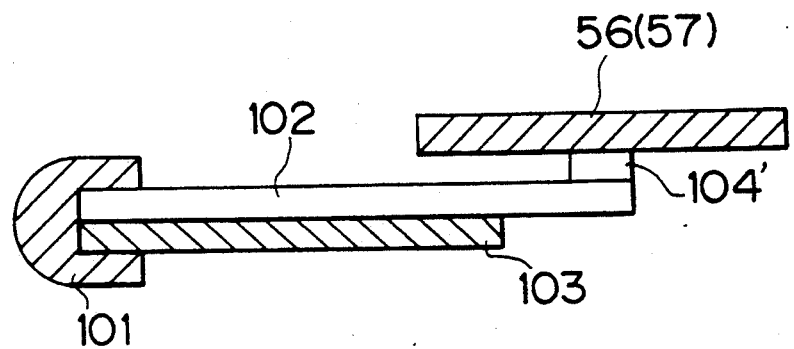
FIG. 20 is an enlarged, cross-sectional view of a mirror supported by an adhesive support adhered to the top end of a bimorph plate, and also supported by a vibration-proof member.

Though the above-mentioned embodiment has explained the case in which the mirror 56 (57) is held by means of the adhesive support 104 in the caught-in manner, the present invention is not limited to that, as shown in FIG. 20, it might be able to be held by means of the adhesive support 104' adhered to the top end of the bimorph plate 102.

Figure 21:
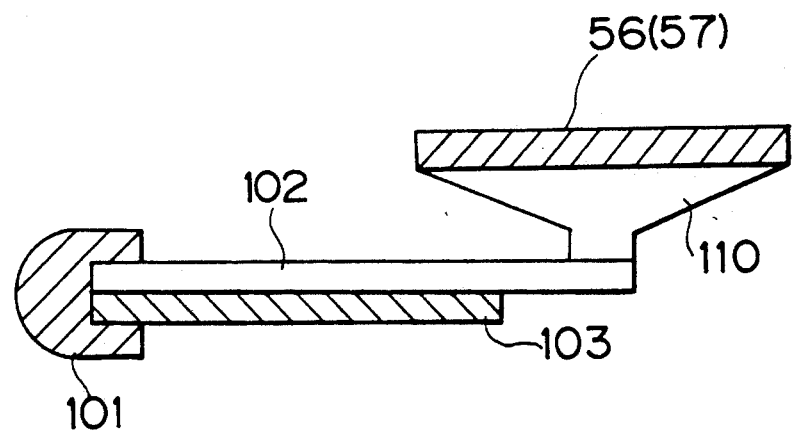
FIG. 21 is an enlarged, cross-sectional view of a mirror supported by a beam attached to the top end of a bimorph plate, and also supported by a vibration-proof member.

Furthermore, as shown in FIG. 21, it might be able to hold the mirror 56 (57) generally by providing a beam 110 so as to make the mirror 56 (57) bend smaller.

Figure 22:
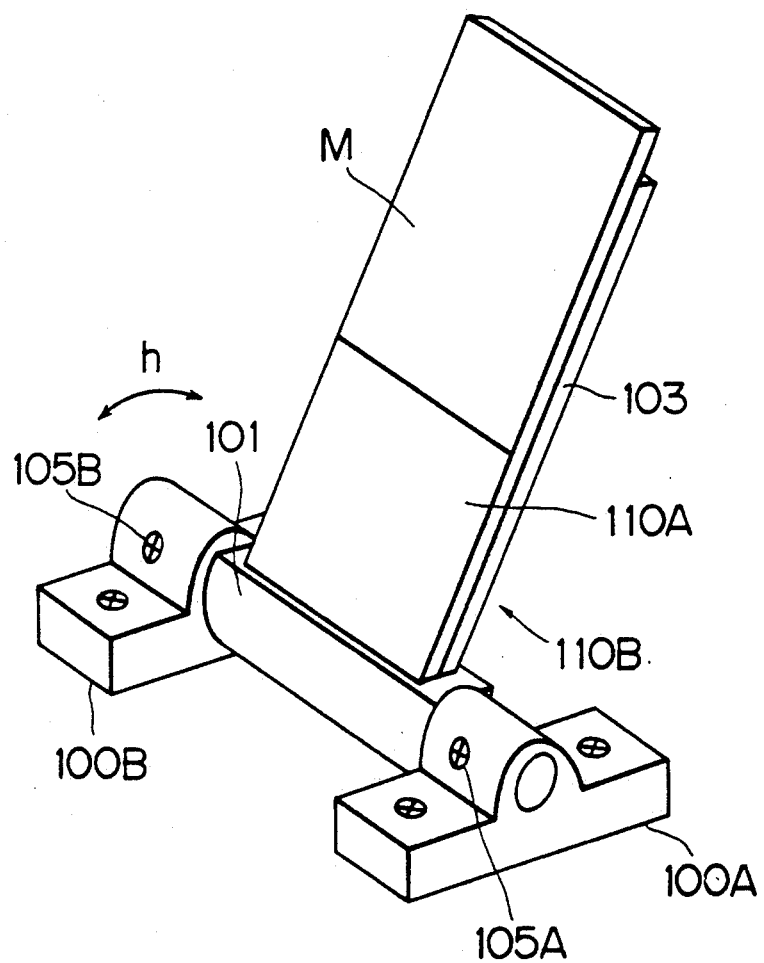
FIG. 22 is an enlarged, perspective view of a mirror formed on one side of a bimorph plate.

Moreover, as shown in FIG. 22, it might be able to form a mirror surface M on one side surface 110A of the bimorph plate 110 and to leave out the mirror 56 (57).

In this case, after grinding the whole surface of the bimorph, on the both side surface 110A and 110B electrodes are formed respectively by plating with NiCr. Subsequently, one of the surfaces (110A) of the electrodes is evaporated with aluminum, so that the mirror surface M is formed on substantially half of the area, at the top end portion of the electrode.

In the above-mentioned construction, it is found that since the bimorph plate 110 is deviated in being held with the root portion itself, a portion adjacent to the root portion bends larger than the other, while an end portion within the half area does not bend as much.

Therefore, by correcting the projecting position of the light beam LA1 by using the thus formed bimorph plate 110, it is possible to obtain an optical atmospheric link apparatus which can correct the projecting position fast and easily.

Furthermore, in the embodiment described above, a suppressing vibration element is adhered on the backside of the bimorph plate, but the present invention is not limited to that. If it is possible to obtain a practical enough servo gain, it might be possible to leave out the suppressing vibration element.

According to the present invention, by correcting the projection position of the light beam, it is able to obtain an optical atmospheric link apparatus which can correct the projection position of the light beam and still be compact in construction. A system control circuit 77 (FIG. 3) comprises an arithmetic and logic processing circuit and serves to control the whole of the optical atmospheric link apparatus 30.

That is, the system control circuit 77 outputs the control signal SC2 to the servo circuit 58 when being supplied with an electric power from the electric power source unit 31 and raises the optical atmospheric link apparatus 30 up to a servo state. When the initialization switch 37 is turned on in this state, the system control circuit 77 outputs the control signal SC1 to drive the motors 60, 61 and to dispose the lens 59A at the position of angular displacement center. The system control circuit 77 outputs the control signals SX, SY to the servo circuit 58 in response to the manipulations of the operation members 38A through 38D to angularly displace the lens 59A.

When the monitor switch 41 is thereafter turned on, the system control circuit 77 outputs the control signal SC1 to display the display video 36 and changes over the magnification of the image pickup optical system 70 in response to the ON manipulation of the zooming operation member 42.

Accordingly, by manipulation of the operation members 38A through 38D after having turned on the initialization switch 37, a user can readily adjust the illuminating position of the light beam LA1 and surely illuminate the light beam LA1 to the transmission object by carrying out the ON manipulation of the servo switch 39 after that adjustment.

On the other hand, when the electric power supply is interrupted, a lock mechanism operates so that the lens 59A is held at the position defined just before the electric power interruption. Also in the case that the battery is exchanged during interruption of the communication, the system control circuit 77 reopens the communication soon after that exchange.

That is, when the initial condition is set by angularly displacing the lens 59A every time the electric power is turned on, it becomes possible to decrease the number of operation members correspondingly by omitting the initialization switch 37. However, in that case, when the battery is merely exchanged, the illuminating position of the light beam LA1 is unnecessarily initialized every time and it becomes necessary to readjust the illuminating position of the light beam LA1.

Accordingly, by separately arranging the initialization switch 37, as in this embodiment, and causing the optical atmospheric link apparatus body 34 to perform the servo operation when the electric power source is turned on, the servo state is canceled only as needed and the adjustment at the time of turning on the electric power source can be omitted.

Thus, in case that the communication would be interrupted, the optical atmospheric link apparatus 30 can soon reopen the communication by starting the electric power supply.

When the system control circuit 77 is powered up to the servo state, it lights up a light emitting element 40A. In this state, when the light beam LA2 is condensed to the light receiving surface of the position detecting sensor 68 within a certain range based on the error signals VERX, VERY of the servo circuit 58, the system control circuit 77 judges that to be a lock condition and then lights up a light emitting element 40B.

Accordingly, in the case that the light emitting element 40A lights up but the light emitting element 40B doesn't light up, it is possible to judge that as a condition that the illuminating position of the light beam LA1 can not be compensated. When this happens, the user manipulates the initialization switch 37 and the operation members 38A through 38D again to readjust the illuminating position of the light beam LA1 and then it becomes possible to surely illuminate the transmission object with the light beam LA1 by performing the ON manipulation of the servo switch 39.

Further, the system control circuit 77 ignores the ON manipulation if the initialization switch 37 is not manipulated even though the operation members 38A through 38D are turned on, so that erroneous manipulations by the user can be effectively avoided.

Incidentally, when the angular displacement of the lens 59A becomes excessively large, it may happen, for example that the servo operation can not follow up a large displacement on the right side even though it can follow up a large displacement on the left side. Therefore, the system control circuit 77 detects the angular displacement degree of the lens 59A by means of limit switches 108, 109 arranged on the rotary shaft of the motors 60, 61 and drives a buzzer circuit 116 when the angular displacement degree increases not less than a predetermined value. The system control circuit 77 provides a warning for the user by sounding a buzzer when the angular displacement degree increases not less than the predetermined value.

The light beam LA1 having the predetermined polarization plane W1, which is projected from the laser diode 51 (FIG. 3A), is converted to the parallel light beam by means of the lens 52, then transmitted by the polarizer 53 through the lens 54 and the lens 55 and reflected by the mirrors 56, 57. The light beam LA1 reflected by the mirrors 56, 57 is transmitted by the half-silvered mirror 69 and then sent to the transmission object through the lenses 59A, 59B.

The bimorph plate 102 (FIG. 12) is displaced by means of the drive signals SX1, SY1 which are output from the servo circuit 58, and the illuminating position of the light beam LA1 can be finely adjusted by angularly displacing a little the mirror 56, 57 which is held by the leading end of the bimorph plate 102, in the horizontal direction and the vertical direction as indicated by the arrows a, b respectively.

On the other hand, the motors 60, 61 angularly displace the lens 59A in the vertical direction and in the left and right direction as indicated by the arrows c, d basing on the drive signals SX2, SY2 which are output from the servo circuit 58, whereby the illuminating position of the light beam LA1 is roughly adjusted.

Thereby, the optical atmospheric link apparatus body 34 illuminates the light beam LA1 to the transmission object by means of the pivotable mirrors 56, 57 and the pivotable lens 59A even in case that the optical atmospheric link apparatus body 34 might be vibrated by a wind and so on.

The light beam LA2 coming from the transmission object is received by the lens 59B, reversely advances along the optical path of the light beam LA1 and then enters the polarizer 53. Since the light beam LA2 as projected from the transmission object has a polarization plane W2 perpendicular to the polarization plane W1 of the light beam LA1, it is reflected by the polarizer 53 and then enters the half-silvered mirror 62.

Herein, a portion of the light beam LA2 is condensed onto the light receiving element 64 through the lens 63 and an information signal 52 transmitted from the transmission object can be received. The residual portion of the light beam LA2 is condensed onto the light receiving surface of the position detecting sensor 68 through the filter 66 and the condensing lens 67, whereby it becomes possible to detect with high accuracy the projection position of the light beam LA2 with respect to the optical atmospheric link apparatus body 34.

One portion of the light beam LA1 is separated therefrom when the light beam LA1 passes through the half-silvered mirror 69 and is directed to the corner cube prism 71 through the shutter 75. The light beam LA1 is retro-reflected by the prism 71 so as to have a parallel optical path and is directed to the image pickup optical system 70 through the shutter 75 and the half-silvered mirror 69.

The observation light L1 advancing from the surrounding scene around the transmission object toward the optical atmospheric link apparatus 30 is received through the lenses 59B, 59A, then reflected by the half-silvered mirror 69 and directed to the image pickup optical system 70. The illuminating position of the light beam LA1 can then be confirmed by viewing it through the image pickup optical system 70.

When the image pickup optical system 70 is driven by the drive circuit 74, the magnification thereof changes. Thereby, the optical atmospheric link apparatus body 34 roughly adjusts the illuminating position of the light beam LA1 with a low magnification and then adjusts the illuminating position by enlarging the magnification in sequence, so that the illuminating position of the light beam LA1 can be readily adjusted by actuating the servo circuit 58 within the predetermined range.

Since the mirrors 56, 57 are driven by using the bimorph plate 102, it is possible to adjust the illuminating position of the light beam LA1 by a simple construction. Additionally, since the vibration-proof member 103 is adhered onto the backside of the bimorph plate 102, it is possible to improve the frequency characteristic of the bimorph plate 102. Since the transmission object is illuminated by the light beam LA1 even after a vibration and so on, it is possible to improve the response characteristic.

According to the above-mentioned construction, since the illuminating position of the light beam is compensated by driving the bimorph plate 102, it is possible to improve the frequency characteristic of the bimorph plate 102 and also to improve the response speed by adhering the vibration-proof plate 103 onto the backside of the bimorph plate 102.

Though the above-mentioned embodiment has explained the case in which the present invention is applied to the optical atmospheric link apparatus and the illuminating position of the light beam is compensated by means of the bimorph plate, the present invention is not limited to that case but also can be widely applied to the case in which various kinds of driven objects are driven by means of the piezoelectric element.

As noted above, according to the present invention, since a vibration-proof member is adhered onto the backside of a piezoelectric element, it is possible to improve the frequency characteristic of the piezoelectric element and to provide an optical atmospheric link apparatus having an actuator with a response speed which is faster than conventional devices.

While there has been described in connection with the preferred embodiments of the invention, it will be obvious to those skilled in the art that various changes and modifications may be made therein without departing from the invention, and it is aimed, therefore, to cover in the appended claims all such changes and modifications as fall within the true spirit and scope of the invention.

What is claimed is:

1. An optical atmospheric link apparatus for transmitting information data through a first light beam and receiving information data through a second light beam projected from a remote transmitter/receiver, comprising:
    a light emission means for emitting the first light beam along a light path;
    an optical lens means, which is selectively angularly displaceable, for condensing the first light beam and projecting it in a direction toward the remote transmitter/receiver and for receiving the second light beam and directing it along the light path;
    a two dimensional sensor means for receiving the second light beam and generating an error signal representative of a difference between the direction in which the first light beam is projected from the optical lens means and a direction in which the second light beam is received from the remote transmitter/receiver;
    a housing for containing the light emission means, the optical lens means and the two dimensional sensor means;
    a light path diverting means for diverting a portion of the light path between the optical lens means and the light emission means so as to change the direction, relative to the housing, in which the first light beam is projected and the second light beam is received by the optical lens means; and
    a control means supplied with the error signal for controlling the light path diverting means so that the direction, relative to the housing, in which the first light beam is projected and the second light beam is received by the optical lens means is aligned with the remote transmitter/receiver despite transitory movement of the housing.

2. An optical atmospheric link apparatus according to claim 1, wherein the control means controls the angular displacement of the optical lens means in accordance with the error signal.

3. An optical atmospheric link apparatus according to claim 1, wherein the light path diverting means includes:
    a pair of first and second mirrors spaced apart from each other by a predetermined distance and obliquely facing each other;
    a first piezoelectric element for driving the first mirror;
    a second piezoelectric element for driving the second mirror; and
    servo driver means connected to the control means for deviating the first piezoelectric element and the second piezoelectric element by impressing voltages upon the first piezoelectric element and the second piezoelectric element.

4. An optical atmospheric link apparatus according to claim 3, wherein the first mirror is mounted to an end portion of the first piezoelectric element and the second mirror is mounted to an end portion of the second piezoelectric element.

5. An optical atmospheric link apparatus according to claim 3, wherein the first mirror comprises evaporated aluminum on a surface of the first piezoelectric element and the second mirror is formed by evaporated aluminum upon a surface of the second piezoelectric element.

6. An optical atmospheric link apparatus according to claim 3, wherein at least one of the first piezoelectric element and the second piezoelectric element is a bimorph.

7. An optical atmospheric link apparatus according to claim 3, wherein the light path diverting means includes:
    servo driver means connected to the control means for deviating the first piezoelectric element and the second piezoelectric element by impressing voltages on the first piezoelectric element and the second piezoelectric element;
    vibration-restricting elements adhered on the backside of each of the first and second piezoelectric elements;
    support elements for separately supporting each of the first and second piezoelectric elements together with a different one of the vibration-restricting elements at different, spaced apart predetermined positions, each supporting element clamping together a first end portion of one of the first or second the piezoelectric elements and an end portion one of the vibration-restricting elements; and
    separate mirrors mounted on a second end portion of each of the first and second piezoelectric elements.

8. An optical atmospheric link apparatus according to claim 3, wherein the first light beam is reflected by the first and second mirrors into the optical lens means and the second light beam is reflected by the first and second mirrors toward the two dimensional sensor means.

9. An optical atmospheric link apparatus according to claim 3, wherein the servo means responds only to high frequency changes in the error signal.

10. An optical atmospheric link apparatus according to claim 1, wherein the light path diverting means includes:
    a piezoelectric element;
    servo driver means connected to the control means for deviating the piezoelectric element impressing a voltage on the piezoelectric element;
    a vibration-restricting element adhered on a backside of the piezoelectric element;
    a supporting element for supporting the piezoelectric element and the vibration-restricting element at a predetermined position, the supporting element clamping together a first end portion of the piezoelectric element and an end portion of the vibration-restricting element; and
    a mirror mounted on a second end portion of the piezoelectric element.

11. An optical atmospheric link apparatus according to claim 1, further comprising a beam-splitting means between the light emission means and the light path diverting mean for transmitting the second light beam, projected through the optical lens means, into the two dimensional sensor.

12. An optical atmospheric link apparatus according to claim 11, wherein the first light beam and the second light beam each have different planes of polarization and further wherein:
    the error signal generated by the two dimensional sensor means is also representative of the degree to which the polarization plane of the first polarized light beam does not perpendicularly intersect the polarization plane of the second light beam;
    a portion of the housing contains the light emission means, the beam-splitting means and the two dimensional sensor means; and
    including servo means supplied with the error signal for rotating the housing portion coaxially about the light path so as to cause the respective polarization planes of the first polarized light beam and the second polarized light beam to perpendicularly intersect.

13. An optical atmospheric link apparatus for transmitting information data through a first polarized light beam and receiving information data through a second polarized light beam projected from a remote transmitter/receiver, comprising:
    a light emission means for emitting the first polarized light beam along a light path;
    an optical lens means for condensing the first light beam and projecting it in a direction toward the remote transmitter/receiver and for receiving the second light beam and directing it along the light path;
    a two dimensional sensor means, including beam splitting means, for receiving the second light beam and generating an error signal representative of the degree to which a polarization plane of the first polarized light beam does not perpendicularly intersect a polarization plane of the second light beam;
    a housing for containing the light emission means and the two dimensional sensor means;
    servo means supplied with the error signal for rotating the housing coaxially about the light path so as to cause the respective polarization planes of the first polarized light beam and the second polarized light beam to perpendicularly intersect.

* * * * *